United States Patent [19]

Liebman

[11] 4,183,080
[45] Jan. 8, 1980

[54] DC TO DC CONVERTER

[76] Inventor: Theodore Liebman, 350 E. Tioga, Philadelphia, Pa. 19134

[21] Appl. No.: 917,466

[22] Filed: Jun. 21, 1978

[51] Int. Cl.² .................................... H02M 3/335
[52] U.S. Cl. ............................. 363/18; 315/219; 331/112; 363/131
[58] Field of Search ................. 331/112; 363/18–21, 363/97, 131; 315/209 T, 219

[56] References Cited

U.S. PATENT DOCUMENTS

| 3,158,751 | 11/1964 | Nelson | 331/112 X |
| 3,243,794 | 3/1966 | Phillips et al. | 331/112 X |
| 3,329,867 | 7/1967 | Stearns | 315/219 X |
| 3,435,320 | 3/1969 | Lee et al. | 363/19 |
| 3,569,779 | 3/1971 | Luursema | 363/18 X |
| 3,575,153 | 4/1971 | Hardin et al. | 363/18 X |
| 3,964,487 | 6/1976 | Judson | 331/112 X |
| 3,989,995 | 11/1976 | Peterson | 363/19 |
| 4,005,351 | 1/1977 | Blum | 363/21 X |

Primary Examiner—William M. Shoop
Attorney, Agent, or Firm—I. Michael Bak-Boychuk

[57] ABSTRACT

A blocking oscillator DC to DC converter includes a first transformer which is charged up and provides feedback to a switching transistor on one half of the cycle and discharges stored energy from the secondary during the second half of the cycle. To reduce switching losses the first transformer driven switching transistor is turned off by a control transistor disposed between the switching transistor base and ground, the control transistor being turned on and off according to the charge on a base capacitor charged by the first transformer. A second transformer may be included to control the power across a gap disposed to kill flying insects.

7 Claims, 2 Drawing Figures

DC TO DC CONVERTER

BACKGROUND OF THE INVENTION

1. Field of the Invention

The present invention relates to DC to DC converters, and more particularly to converter oscillators of the ringing choke type adapter for use in insect killing devices.

2. Description of the Prior Art

DC to DC conversion has had extensive applications in the past. Such converters can be found in gaseous lamps, automotive ignition systems of the capacitor discharge type, in laser pumping circuit and many other applications. Most frequently converters of the foregoing kind lacked the requisite efficiency for portable use. In particular devices like bug killers used by campers require portable battery power and thus the manner in which that power is used is of a paramount importance. The typical prior art converters normally experience substantial power losses during the switching transient of each oscillation. In the typical ringing choke configuration the collector winding develops current levels which are quickly above the saturated conduction levels of the base. At this point the base drive becomes insufficient to maintain the switching transistor in saturated conduction causing a slow turn-off with its attendant losses.

In the past various techniques were developed to improve this switching transient, both for optimization of efficiency and to improve frequency control. In each instance the improvements entail circuit complexity or the use of special purpose elements and their related expense.

SUMMARY OF THE INVENTION

Accordingly it is the general purpose and object of the present invention to provide a DC to DC converter which by way of a control transistor both improves switching efficiency and frequency control.

Other objects of the invention are to provide a DC to DC converter of the ring choke type having a control transistor in the base circuit of the switching transistor.

Yet additional objects of the invention are to provide a DC to DC converter which is reliable in use, entails few parts and is stable over a wide range of load and power inputs.

Briefly these and other objects are accomplished within the present invention by combining a base control transistor into the circuit of a ring choke oscillator, the base control transistor being switched in and out of conduction by the phase between the collector and base windings of the switching transistor forming the oscillator. To control the phase angle accurately a capacitor is provided across the base-emitter leg of the control transistor and it is the current ratio set by this base capacitor which control the conduction of the control transistor. By virtue of these additional elements the following advances are obtained: the main switching transistor is switched at a fast turn-off rate, resulting in lowered switching losses; the cycling rate of the control transistor is determined by an RC time constant rather than by transistor gain which varies from device to device, and supply voltage variations are compensated by faster turn-ons of the control transistor and low losses are further enhanced due to base diode which reduces reverse currents.

DESCRIPTION OF THE SPECIFIC EMBODIMENTS

Figure 1:
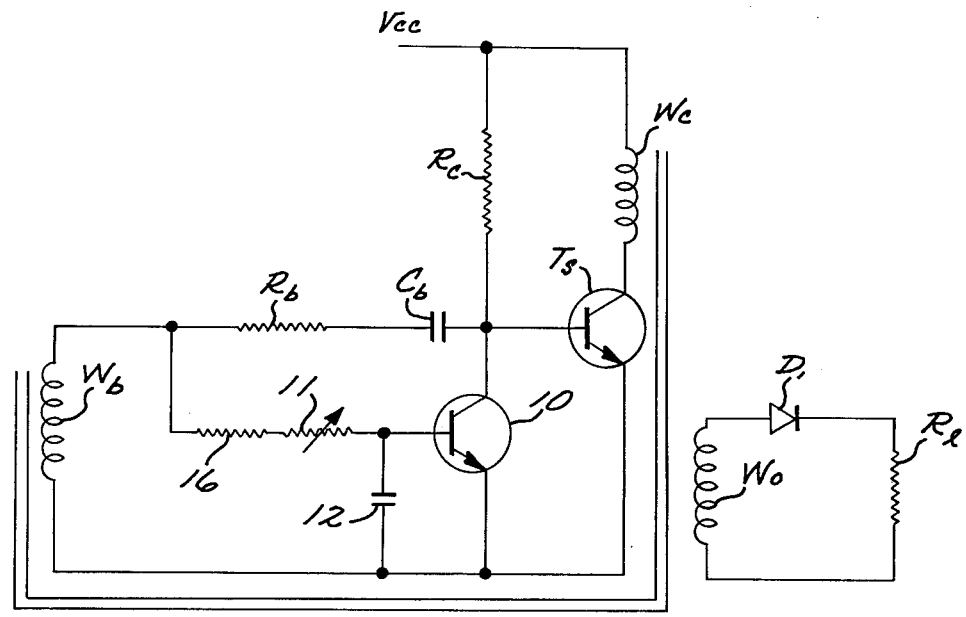
FIG. 1 is a circuit schematic of a ring choke converter including a control transistor circuit constructed according to the invention herein.

The following disclosure entails an improvement on a prior art device and for that reason alphabetic symbols designate the structure improved. Accordingly as shown in FIG. 1 a prior art ring choke oscillator includes a collector winding $W_c$ tied between the collector of the switching transistor $T_s$ and the collector source $V_{cc}$ across which the collector current is applied. A base winding $W_b$ is connected to the base $T_s$ across circuit connection including a resistor $R_b$ and a capacitor $C_b$. A further control or base bias is obtained by yet another resistor $R_c$ deployed across the collector winding $W_c$ and the base of transistor $T_s$. This configuration, without the added parts, comprises a typical ring choke converter which drives an output winding $W_o$. The current in winding $W_o$ is rectified across a diode (optional) $D_l$ to power the load $R_l$.

In this circuit as the transformer core $T_l$ charges and discharges during each cycle the current through resistor $R_c$ charges capacitor $C_b$ and turns the transistor $T_s$ on. Since the feedback through $W_b$ is positive transistor $T_s$ saturates and remains saturated until the base signal drops off across capacitor $C_b$. As the drop across capacitor $C_b$ brings the base drive below the level necessary to maintain the transistor in saturation transistor $T_s$ slowly begins turning off. When $T_s$ turned off a forward voltage is developed across load $R_l$ discharging the core. During this discharge period capacitor $C_b$ is discharged through winding $W_b$.

In order to improve this slow transistion of the above circuit and the periodic reverse currents in windings $W_b$ a control transistor 10 is connected between the base and emitter of transistor $T_s$. Transistor 10 is controlled by a resistor 16 in series with a variable resistor 11 disposed between the winding $W_b$ and the base thereof and a capacitor 12 connected to ground. Resistor 11 together with resistor 16 and capacitor 12, control the base signal of transistor 10, thus controlling the on time of transistor $T_s$.

Accordingly with few additional parts substantial improvements and efficiency are obtained. More specifically as current flows through resistor $R_c$ and resistor $R_b$ to the base of transistor $T_s$, transistor $T_s$ turns on. Concurrent with the increase of signal across resistor 11 the current in winding $W_c$ increases. An increase in current through winding $W_c$ is accompanied by an increase in winding $W_b$, increasing the charging rate of capacitor 12. When the charge on capacitor 12 reaches the conduction level of transistor 10 transistor $T_s$ is turned off decreasing the current through winding $W_c$ and concurrently the current in the winding $W_b$. As the signal across winding $W_b$ decreases transistor 10 is turned off.

The additional features of this circuit provide for compensation of the collector voltage variations. More specifically as $V_{cc}$ increases the voltage across winding $W_b$ also increases. This is accompanied by an associated increase in the charging current to capacitor 12.

Figure 2:
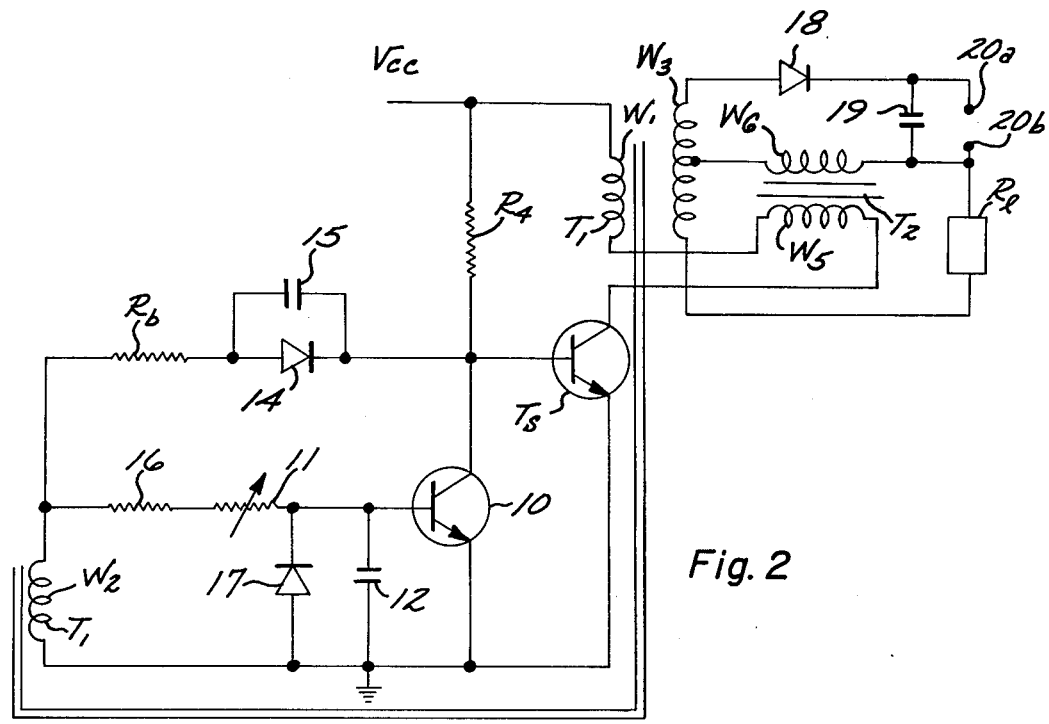
FIG. 2 is a variation of the circuit shown in FIG. 1 illustrating alternate circuit implementation for further reducing base loss including second transformer.

An alternative configuration for the above circuit is set out in FIG. 2. In this circuit a diode 14 in parallel with a capacitor 15 is substituted for capacitor $C_b$, reducing reverse current and cutting these losses substantially.

In addition, or in the alternative, a diode 17 across capacitor 12, limits peak reverse voltage on capacitor 12. This improves frequency control and improves regulation of circuit from power supply variations. Included further is a second transformer core $T_2$ having its primary $W_5$ connected in series with the primary $W_1$ of transformer $T_1$. The secondary $W_6$ of transformer $T_2$ extends from a tap of winding $W_3$ to one end of the load $R_L$, which in this case may be a gaseous tube. The other end of load $R_L$ is connected to one end of the winding $W_3$ while the other end of the winding connects across a diode 18 to a capacitor 19. Capacitor 19 then connects to the common juncture of the winding $W_6$ and load $R_L$, there being two electrodes $20_A$ and $20_B$ disposed across the capacitor. It is between these electrodes that a potential is developed to kill flying insects.

Thus, when transistor $T_s$ turns off the voltage across windings $W_3$ and $W_6$ is additive. The load, in the form of a gaseous tube, begins to conduct. The inductance of the winding $W_6$ then controls the discharge across the load. Accordingly the voltage across the gap between electrodes $20_A$ and $20_B$ is equal to the voltage across winding $W_3$ minus the voltage across the load. This voltage between the electrodes may be used to kill insects. When an insect flies into this gap the increased current must also flow through the load $R_L$, since the inductance of winding $W_6$ effectively limits the amount of current passed thereacross. This last feature assists in the maintenance of the power across the electrodes while the insect is electrocuted.

It is to be understood that any capacitance in the gap will reduce the gap voltage. Accordingly diode 18 is provided to charge up the gap capacitance thereby increasing output voltage with some input power while capacitor 19 provides the stored energy for the initial transient.

Obviously many modifications and variations to the above disclosure can be made without departing from the spirit of the invention. It is therefore intended that the scope of the invention be determined solely on the claims appended hereto.

What is claimed is

1. In a ring choke oscillator including a switching transistor connected by its collector to one end of a first transformer winding, by its base across a first capacitor and a first resistor to one end of a second transformer winding and across a biasing resistor to the other end of said first winding said other end of said first winding being connected to a source of electrical signal, and by its emitter to the other end of said second winding, said first and second windings being magnetically coupled to a third winding connected across a first load, the improvement comprising:

a control transistor connected by its collector to the base of said switching transistor and by its emitter to the emitter of said switching transistor;
a second capacitor connected between the base and emitter of said control transistor; and
a resistor connected between said one end of said second winding and the base of said control transistor, whereby said second capacitor is charged and discharged through said second resistor according to the electrical potential across said second winding relative the charge on said second capacitor to periodically render said control transistor conductive and thereby render said switching transistor non-conductive.

2. Apparatus according to claim 1 wherein:
said second resistor is variable for manual selection of the charging and discharging rate of said second capacitor, thereby varying input power.

3. Apparatus according to claim 1 wherein:
said first capacitor is replaced by a parallel circuit of a base driving diode and a third capacitor.

4. In a DC to DC converter including a blocking oscillator rendered oscillator by the base to collector relationship of a switching transistor, the improvement comprising:

a control transistor connected between the base and emitter of said switching transistor;
a control capacitor connected between the base and emitter of said control transistor; and
base drive means coupled between the base of said switching transistor and the base of said control transistor for rendering said control transistor conductive during the charging time of said control capacitor.

5. Apparatus according to claim 4 wherein:
said control and switching transistors are NPN transistors.

6. In DC to DC converter including a first transformer having a first winding operatively connected to the collector of a switching transistor, a second winding operatively connected at one end across a base circuit to the base of said switching transistor and by the other end to the emitter thereof and a third winding operatively connected to drive a load, the improvement comprising:

a control transistor connected by its collector to the base of said switching transistor and by its emitter to the emitter of said switching transistor;
a control capacitor connected across the base and emitter of said control transistor;
an adjustable control resistor operatively connected between said one end of said second winding and the base of said control transistor;
a second transformer having a fourth winding connected between said collector of said switching transistor and said first winding and a fifth winding tapped to said third winding at one end and connected at the other end to said load; and
electrode means connected in circuit with said load for providing a gap in series therewith.

7. Apparatus according to claim 6:
wherein said load includes a gaseous tube.

* * * * *